United States Patent
Augusto et al.

(10) Patent No.: US 7,316,181 B2
(45) Date of Patent: Jan. 8, 2008

(54) MACHINE TO EXTRACT OIL FROM FRUIT

(75) Inventors: José Luis Comanini Augusto, Araraquara (BR); Paulo Shisuo Moma, Araraquara (BR); Gilmar da Silva Sena, Araraquara (BR); Luiz Fernando da Cruz Baptista, Araraquara (BR); Wagner Ferreira Freire, Araraquara (BR); Francisco Celso Brocchetto, São Paulo (BR); Luciano Rodrigues, São Carlos (BR); Mitsuo Kannami, Araraquara (BR); André Vicente Ricco Lucato, Araraquara (BR)

(73) Assignee: FMC Technologies Do Brasil LTDA., Araraquara SP (BR)

( * ) Notice: Subject to any disclaimer, the term of this patent is extended or adjusted under 35 U.S.C. 154(b) by 589 days.

(21) Appl. No.: 10/275,167

(22) PCT Filed: May 2, 2001

(86) PCT No.: PCT/BR01/00055

§ 371 (c)(1),
(2), (4) Date: May 27, 2003

(87) PCT Pub. No.: WO01/82721

PCT Pub. Date: Nov. 8, 2001

(65) Prior Publication Data

US 2003/0213379 A1   Nov. 20, 2003

(51) Int. Cl.
*A23L 1/00* (2006.01)
(52) U.S. Cl. .......................... 99/509; 99/536
(58) Field of Classification Search ................. 99/488, 99/489, 495, 496, 536, 509–513, 516, 501; 83/866–868
See application file for complete search history.

(56) References Cited

U.S. PATENT DOCUMENTS

| 2,354,878 | A | * | 8/1944 | Platt ............................ 99/510 |
| 3,707,176 | A | | 12/1972 | Bushman .......................... 83/2 |
| 3,952,647 | A | * | 4/1976 | Holbrook et al. ......... 100/98 R |
| 3,954,032 | A | | 5/1976 | Holbrook .......................... 83/2 |
| 4,070,959 | A | * | 1/1978 | Bushman et al. ............. 99/510 |
| 4,248,142 | A | * | 2/1981 | McKinney, Jr. .............. 99/509 |
| 4,470,344 | A | | 9/1984 | Bushman ..................... 99/509 |
| 5,826,496 | A | | 10/1998 | Jara ......................... 99/443 C |
| 6,426,107 | B1 | | 7/2002 | Thomas et al. ............. 426/483 |

* cited by examiner

*Primary Examiner*—Timothy F. Simone
(74) *Attorney, Agent, or Firm*—Allen, Dyer, Doppelt, Milbrath & Gilchrist, P.A.

(57) ABSTRACT

A modulating machine is used to extract and recover the essential oil from citrus fruit such as lemons, oranges, mandarins, grapefruit, etc. not removing their peel, but by microperforating it and disrupting oil cells. The oil thus extracted is trapped in water so as to form an aqueous emulsion. The created machine includes a set of grooved disks (9) mounted over corresponding supporting axes (8); a base structure (1) on which lower portion there is a transmission set installed, formed by pulleys (2) and chains or grooved belts (3) operated by a motor (4); a set of supporting axes (8) provided with alternate axial and rotational movement, by a set of operation members (10) interconnected to rod (11) transmitting alternate movement to the connected handles (12), alternating to the ends (13) of the supporting axes (8). The machine also includes an emulsion tank (15) laterally provided with collectors (16); spillway (30); disk cleaning set (9) fruit washing and drying unit; and an automatic lubrication system for application of oil and grease at specific points.

17 Claims, 13 Drawing Sheets

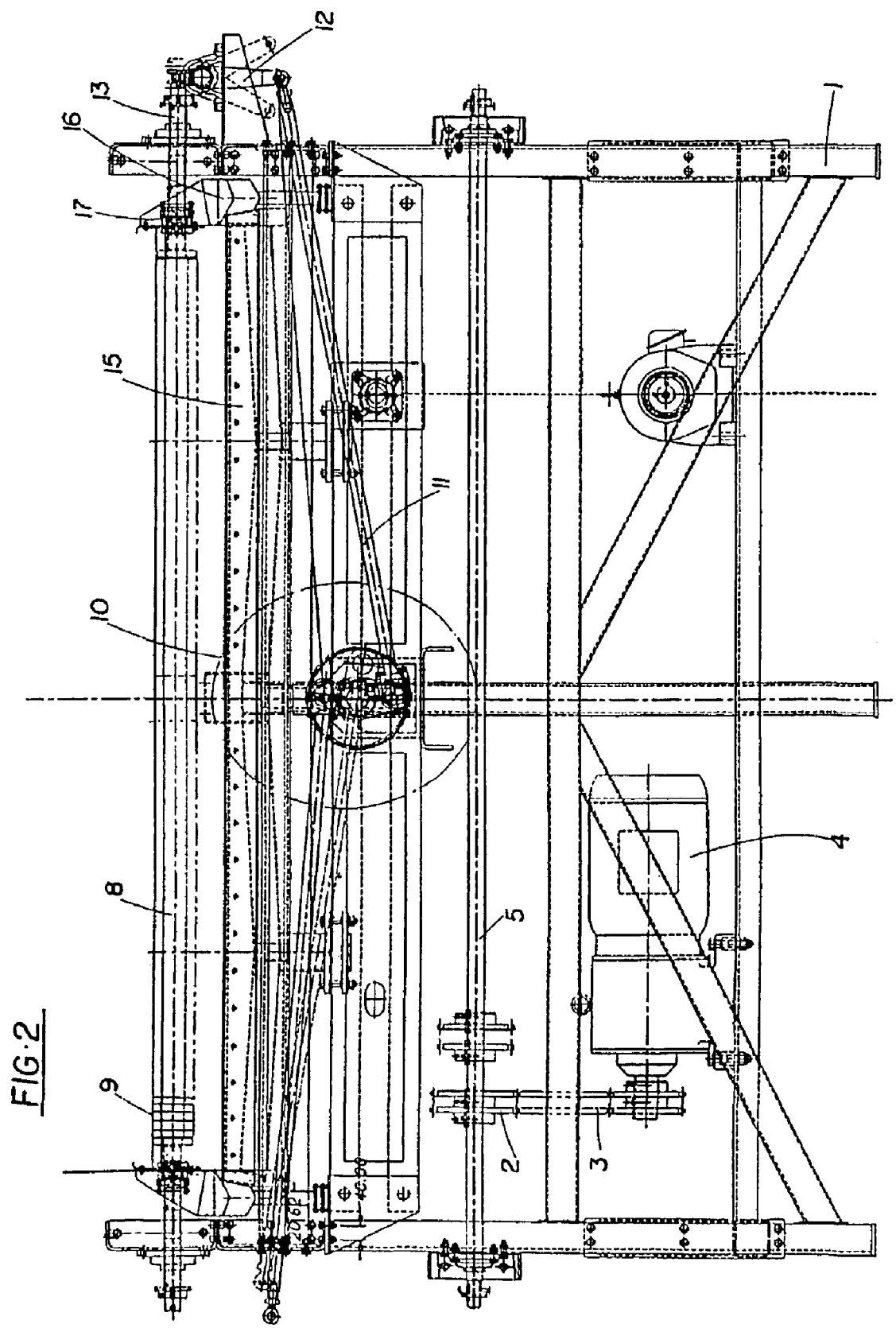

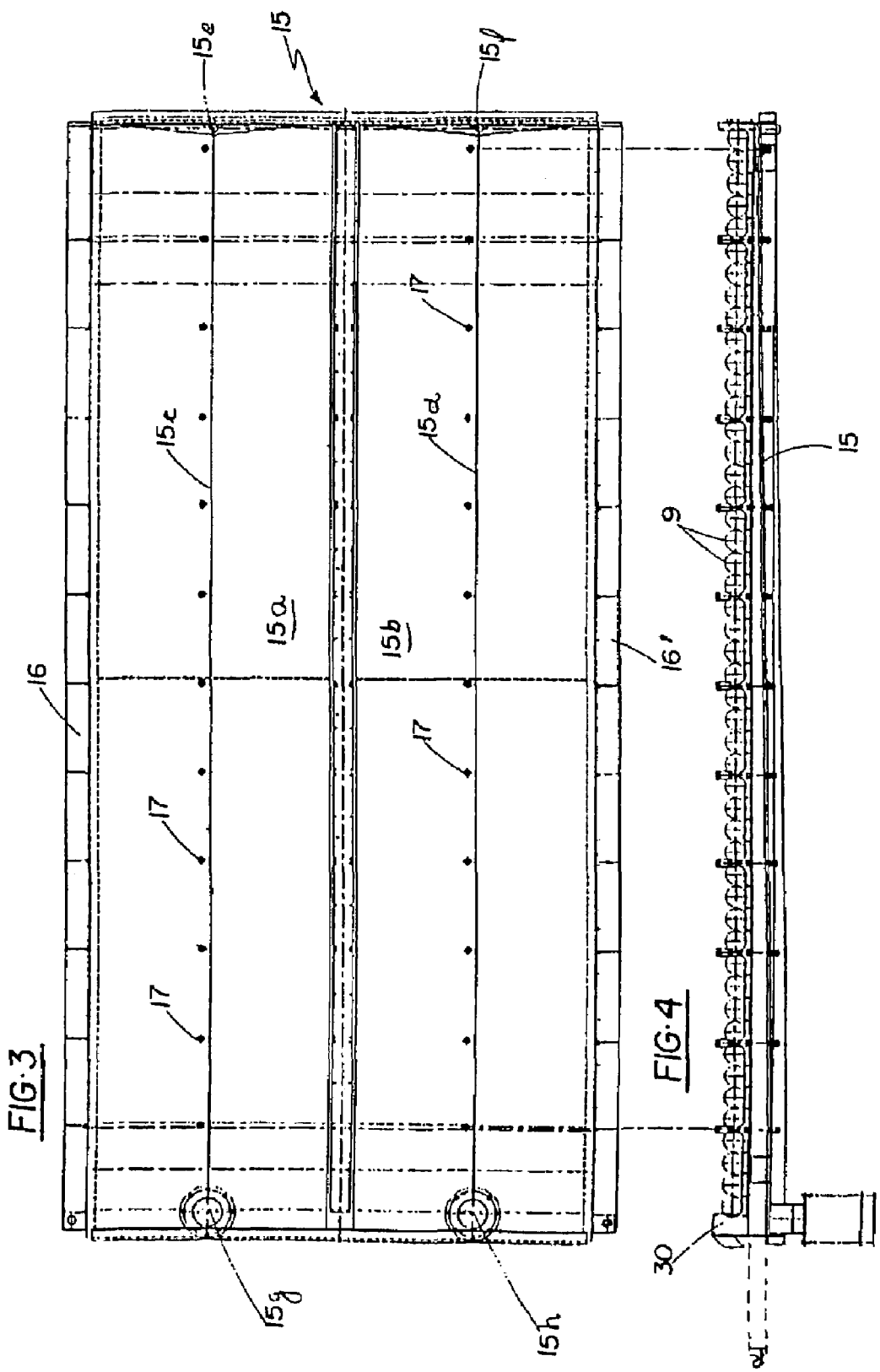

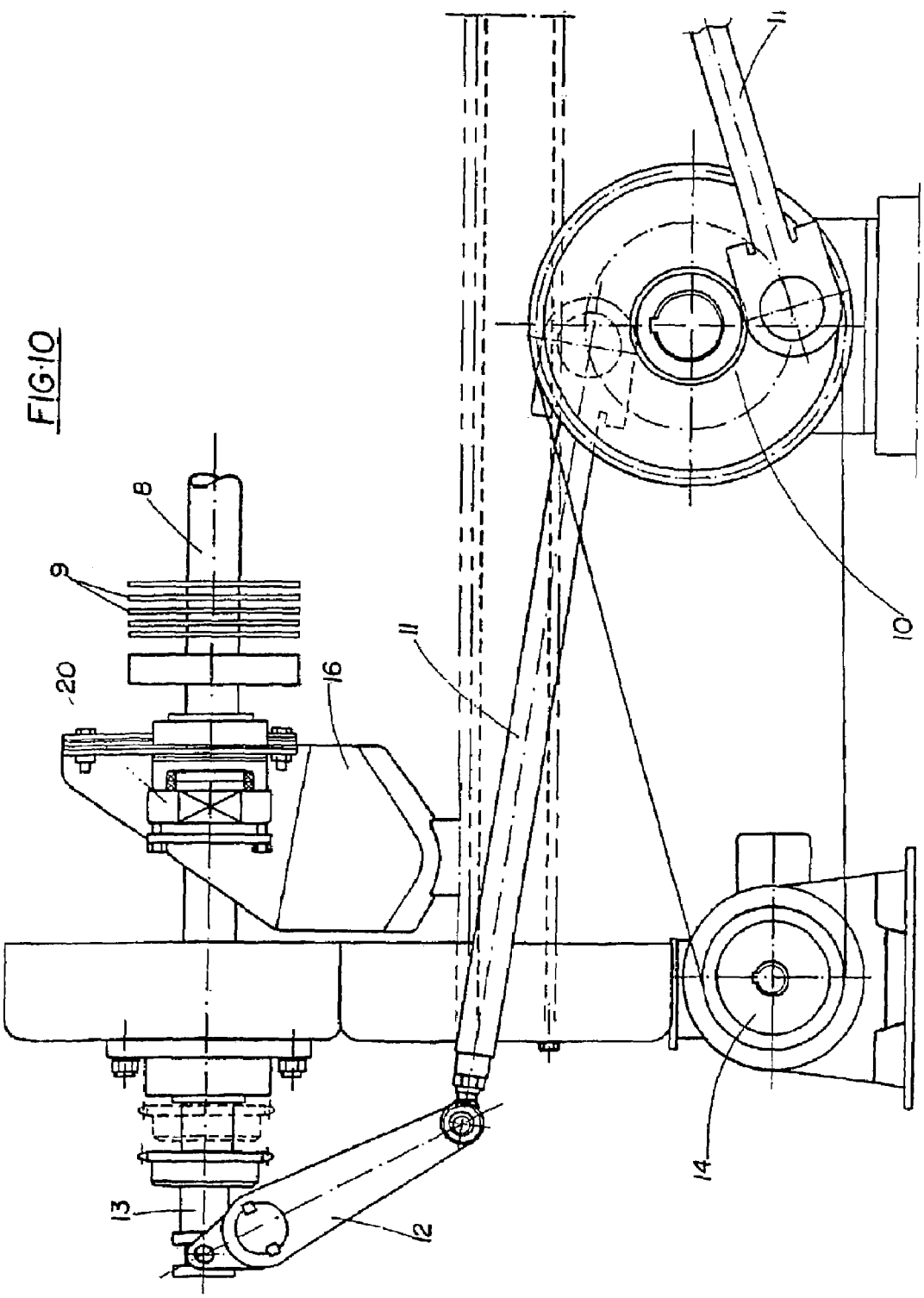

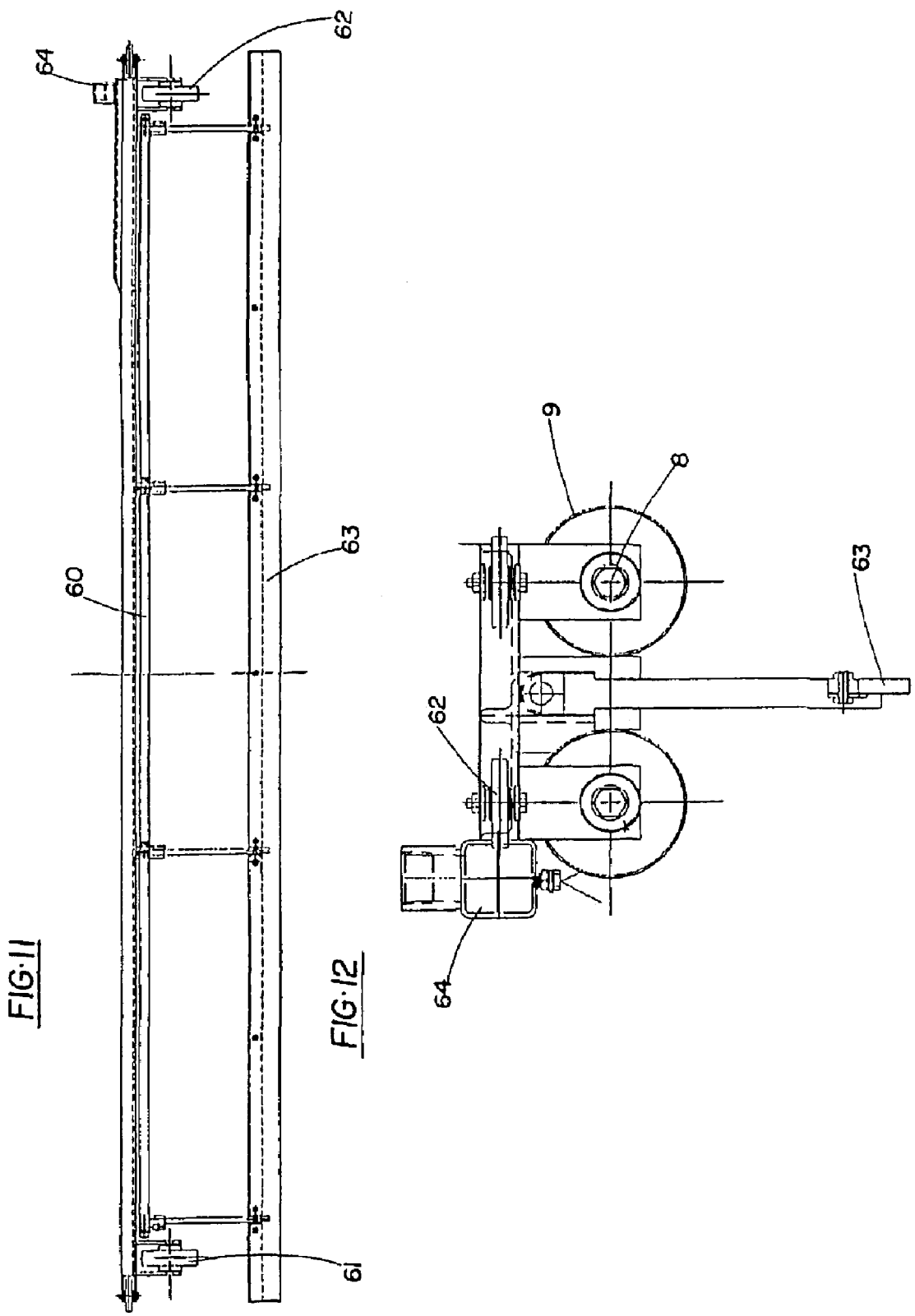

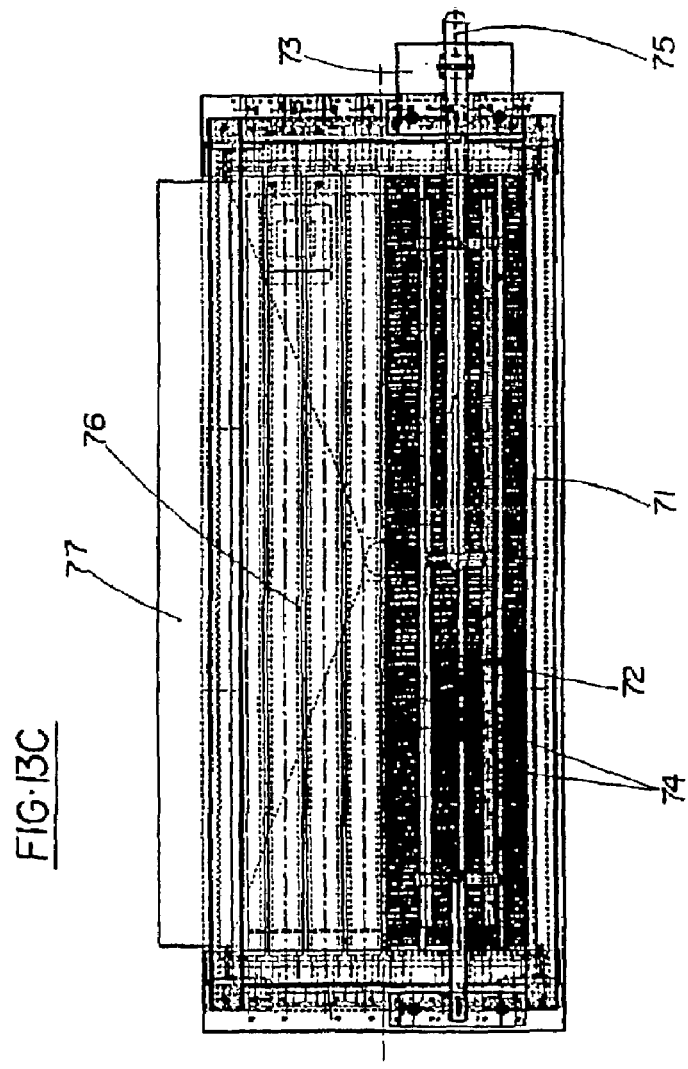
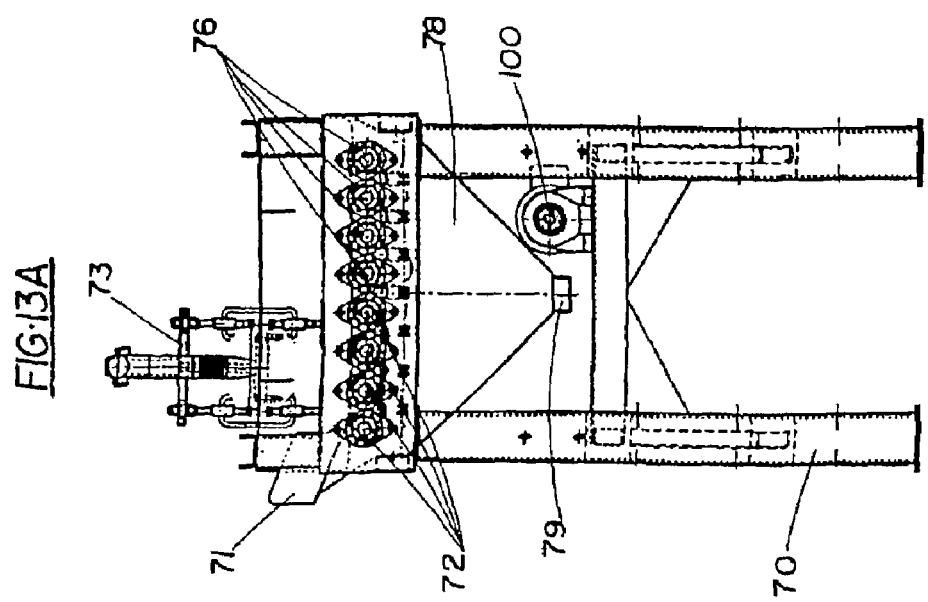
FIG·13C
FIG·13A

MACHINE TO EXTRACT OIL FROM FRUIT

APPLICATION FIELD OF THE INVENTION

The invention deals with a modulating machine, used to extract and recover essential oil from citrus fruit such as lemons, oranges, mandarins, grapefruit, etc, wherein the peel is not removed, but by means of microperforation of the peel and disruption of the oil cells. The oil thus extracted is trapped in water, so as to form an aqueous emulsion.

BACKGROUND OF THE INVENTION

The extraction and recovery of essential oil from citrus fruit is discussed in the Brazilian patents PI 8002964 and PI 8402231, both no longer valid. Said patents refer to machines previously described in the U.S. Pat. Nos. 3,707,176, 3,954,032 and 4,070,959, which are incorporated herein as general reference.

The Brazilian patent PI 8002964 describes a device to extract oil from the peel of non-round citrus fruit and refers to the non-suitability of the machines as described in the U.S. Pat. Nos. 3,707,176, 3,954,032 and 4,070,959 for such an application. That device comprises a pair of parallel horizontal serrated cylinders forming recesses within them to receive the fruit, means to rotate said cylinders in the same sense and means to cause axial displacement movement relative to said cylinders, so that such axial displacement promotes a change in fruit direction relative to such cylinders. Furthermore, said cylinders are immersed in water.

Oil extraction in that equipment is accomplished by cutting the fruit peel by the cylinders in a region below the water level.

The Brazilian patent PI 8402231 refers directly to U.S. Pat. No. 4,070,959 and presents an improvement therein introduced. As described in the mentioned patent PI 8402231, the improvement consists of providing water spraying pipes, spaced apart inside the closed recipient, intended to spray water directly over the external surface of each fruit, thus carrying the essential oil extracted from them through the cylinder teeth. As per the description, that improvement intends to keep any bacteria coming from so-called "lower quality" fruit from being transferred to good quality fruit through the "water bath". It is also noted in FIGS. 6 and 7 of that patent that the serrated rings have a slight inclination relative to the cylinder that supports them.

Despite the fact that such machines, as described above, perform acceptable processes of extraction of essential oil from citrus fruit, they present, industrially speaking, a few limitations regarding the art, such as operation conditions, maintenance and versatility of application required by an industrial process. Some of these limitations can be summarized as follows:

equipment modularity—machines known in the art are large, appropriate only for high production and therefore built as individual units, specific to meet a given application;

emulsion tank—there is one single tank with the purpose of a tank per se, with structure to receive the bearing of a disk shaft acting both as a bearing and sealing. Sealing uses an o-ring, which limits the shaft rotation to a lower rotation than the bearing. This does not allow increasing the rotation and processing ability of the machine;

bearing of disk shaft—the bearing is made of graphite chuck, it is self-aligning and has rolling purposes. It has axial translation and sealing to limit rotation, thus forbidding an increase in speed and in fruit processing capacity. Graphite used in the bearing promotes emulsion contamination, as it is in direct contact with said bearing;

axial movement system—operation is done by means of a rotating lateral axis, by intermediate vertical axis actuated by cylindrical cams, operated by means of arms and two axis simultaneously. That configuration requires a larger quantity of items, such as bearings for the lateral axis, vertical axis, fastening supports and further lubricating points;

disk cleaning system—Cleaning is manual, using a high-pressure hose, with the remaining fruit over the disks needing previous removal.

fruit feed system—Fruit are fed in batches, by means of a timer.

SUMMARY OF THE INVENTION

It is therefore an object of this invention to provide a machine that extracts and recovers essential oil from citrus fruit, advantageously solving the existing problems of the machines known in the art, as described above.

Another object of this invention is to provide a machine that extracts and recovers essential oil from citrus fruit, offering a significant improvement in recovering efficiency of the oil extracted from fruit.

These and other objects are attained by means of a machine presenting the following improvements, among others:

(i) modular conception;
(ii) independent emulsion tank with a lateral collector;
(iii) self-aligning disk axis bearing, separately from the emulsion tank;
(iv) lateral axis with oscillating movement;
(v) automatic disk cleaning joined to the fruit remover;
(vi) automatic tank cleaning;
(vii) self-cleaning spillway with level control;
(viii) automatic lubrication system;
(ix) washer and drier with independent operation; and
(x) rotational and axial movement system with variable speed.

More specifically, such improvements, their effects and advantages are represented by:

modularity: the machine of the invention is built into modules, thus allowing for quick changes in configuration for a required fruit processing capacity. Modularity occurs in both dimensions, length and width, thus allowing for flexibility as a function of different customer processing capacities. This characteristic provides easier manufacture and wider range of offer with a high proportion of common components and consequently a reduced number of special parts. It results in more flexibility to compose the final equipment, reduces stocks and increases the negotiation power when purchasing components, due to the larger availability of common components in the market. Furthermore, it makes the assembling process more easily managed, enabling the simultaneous realization of various sets for later final assembly;

emulsion tank: the tank is separate from the equipment structure, thus facilitating its manufacture, installation and maintenance. That solution allows for more flexibility as to concepts for disk axis sealing, thus favoring the elimination of emulsion leaks and loss through lateral collectors, by keeping the feeding and discharge in closed circuit. It also provides for modular assembly of sets of four disk axes, to make maintenance easier;

axis sealing: independent disk axis sealing was projected to have higher limiting rotation values than in existing machines. It also allows for quick substitution, with no need to disassemble the disk axis bearing;

collectors: the tank structure includes two lateral collectors, which main purpose is to collect emulsion leakage from the axis interface provided with rotation and translation movement with its sealing;

emulsion control: control of feeding water flow in the tank by means of valves and a flowmeter to control the oil content in the emulsion, in the process of citrus oil recovery;

automatic tank cleaning: a nozzle system located in the bottom of the tank, with specific arrangement for cleaning during operation intervals;

spillway: allows the control of water level in the tank, thus resulting in better exposure of the oil cell perforating disks according to the size of the fruit to be processed. Its configuration allows for self-cleaning of floating solid matter;

disk axis bearing: self-compensating rolling bearing with an axial sliding chuck which can be lubricated with no need of special food grade lubricants. There is no potential contamination risk in the process;

axial movement system: effected by two lateral axes with oscillatory movement, by using the concept of handle rod and through an arm directly activating disk axes simultaneously and within alternate positions;

disk cleaning system: set located above disk axes, equipped with lengthwise translation operation following the natural fruit flow, simultaneously arranged to the fruit removing system;

automatic lubrication system: including an electrical panel with pumping, distribution and monitoring lubrication center for the bearings and chains. A timer operation eliminates manual intervention and reduces lubricant consumption by monitoring lubricant levels, thus resulting in longer working life for components, lower operational costs and avoiding stops for maintenance;

rotational and axial moving system under variable speed: allows the increase in the extracting efficiency of the machine as a function of variety, size, shape and oil content available in fruit.

BRIEF DESCRIPTION OF FIGURES

Improvements and effects provided by the modulating machine for oil extraction and recovery object of this invention will be apparent for the skilled in the art from the attached schematic figures, in which:

FIG. 2 shows a front view of the machine;

FIG. 3 shows an upper view of the emulsion tank;

FIG. 4 shows a longitudinal view of the lateral collector;

FIG. 10 shows an enlarged front view of the axial movement set;

FIG. 11 shows a front view of the disk cleaning set;

FIG. 12 shows a side view of the disk cleaning set, stressing the spraying nozzle.

FIGS. 13a, 13b and 13c show respectively side, front and higher views of the fruit washer and drier;

DETAILED DESCRIPTION OF PREFERRED EMBODIMENTS

Throughout this description, equivalent parts as illustrated in the figures will be identified only once in each figure. Furthermore, in the present description only the essential and innovative components of the machine will be detailed, since other components, structures and features are generally already known in the art, from the above mentioned references or from classical mechanical projects for machine building in general.

Figure 1:
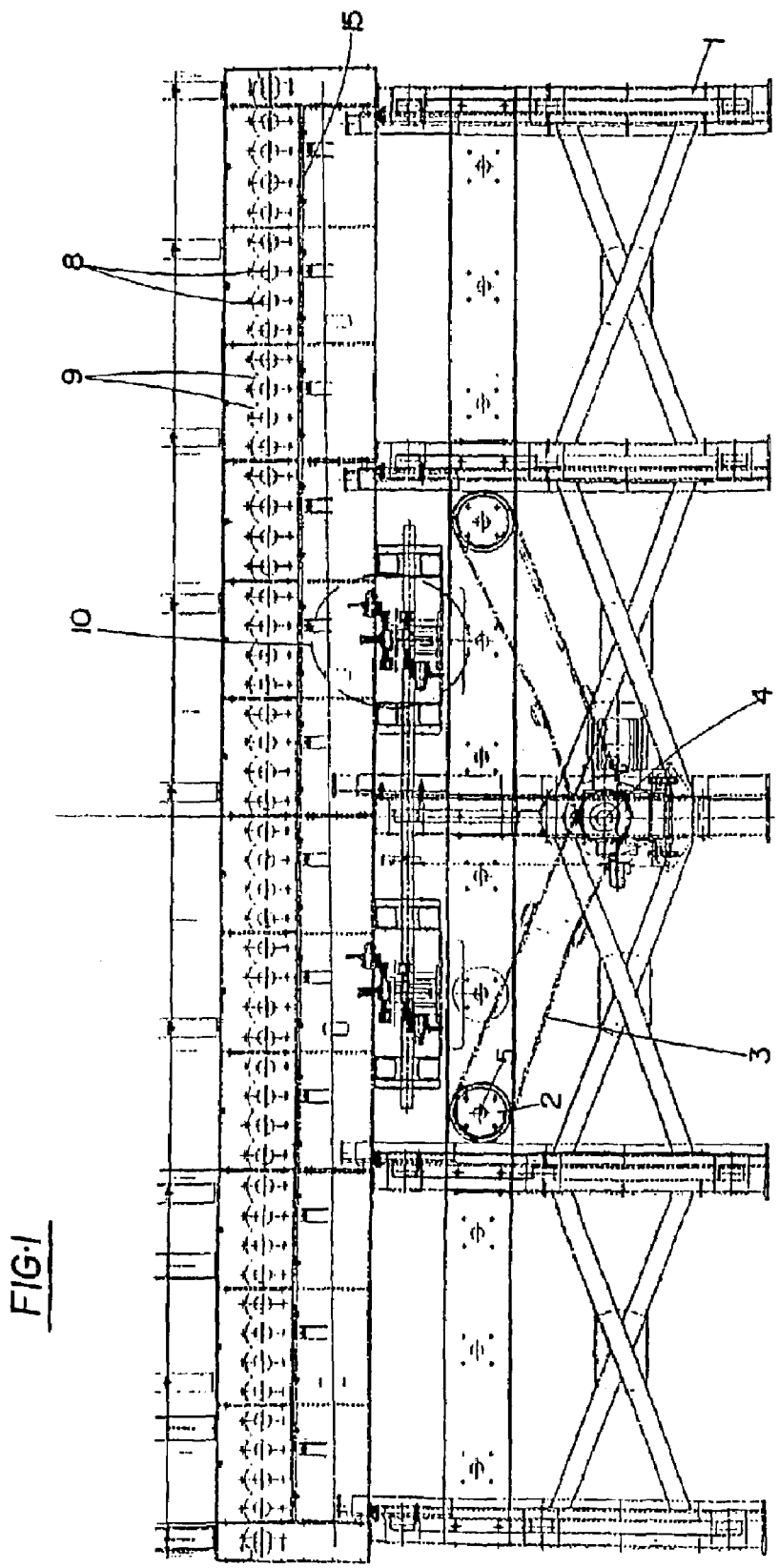
FIG. 1 shows a side view of the machine.

In FIGS. 1 and 2, one can notice that the modulating machine for extraction and recovery of oil object of this invention consists of a basic or chassis structure (1), in which lower portion there is an installed transmission set formed by pulleys (2) and serrated chains or belts (3) operated by a motor (4). That set transmits by means of axis (5) movement to a range of pulleys and chains (which are illustrated and described below), which re-transmit such movement to other pulleys providing for movement to the supporting axes (8). Over said supporting axes (8), there areserrated disks (9) responsible for the extraction of citrus oil from fruit. Besides the rotational movement, said supporting axes (8) are provided with alternated axial movement, by means of an operation set (10) interconnected to a motor reducing set. Said sets are connected to the piston rods (11) which transmit alternated movement to the handles (12), which are alternatively connected to the ends (13) of said supporting axes (8). Details of that connection are better viewed on FIG. 11, as described below. All pulleys and chains mentioned above can be substituted with similar elements to perform the same function, such as serrated wheels, serrated belts or similar.

The whole set of supporting axes (8) with disks (9) is located over the emulsion tank (15), laterally equipped with collectors (16) for eventual emulsion leakage through the bearings (40) of said supporting axes (8). It must be stressed that said rotation-bearing means (40), in contrast with the machines known in the art, are located outside the emulsion tank (15), thus avoiding any kind of contamination of the citrus oil extracted by the machine.

FIG. 3 shows an upper view of the emulsion tank (15), which consists of two contiguous cells (15a) and (15b) provided with inclination towards their corresponding longitudinal axes (15c) and (15d), alongside which sets of spraying nozzles (17) are appropriately positioned. Said tank is surrounded by side walls to form a kind of tub to retain the collected water-citrus oil mix inside it and keep the discharge feeding outlets (15g) and (15h). On its side, lateral collectors for emulsion leakage (16) and (16') can be seen, and the spillway (30) on the rear side.

On FIG. 4, one can observe that said emulsion tank (15) has a slight inclination "α" towards the spillway (30) and the water-citrus oil emulsion collector.

Figure 5:
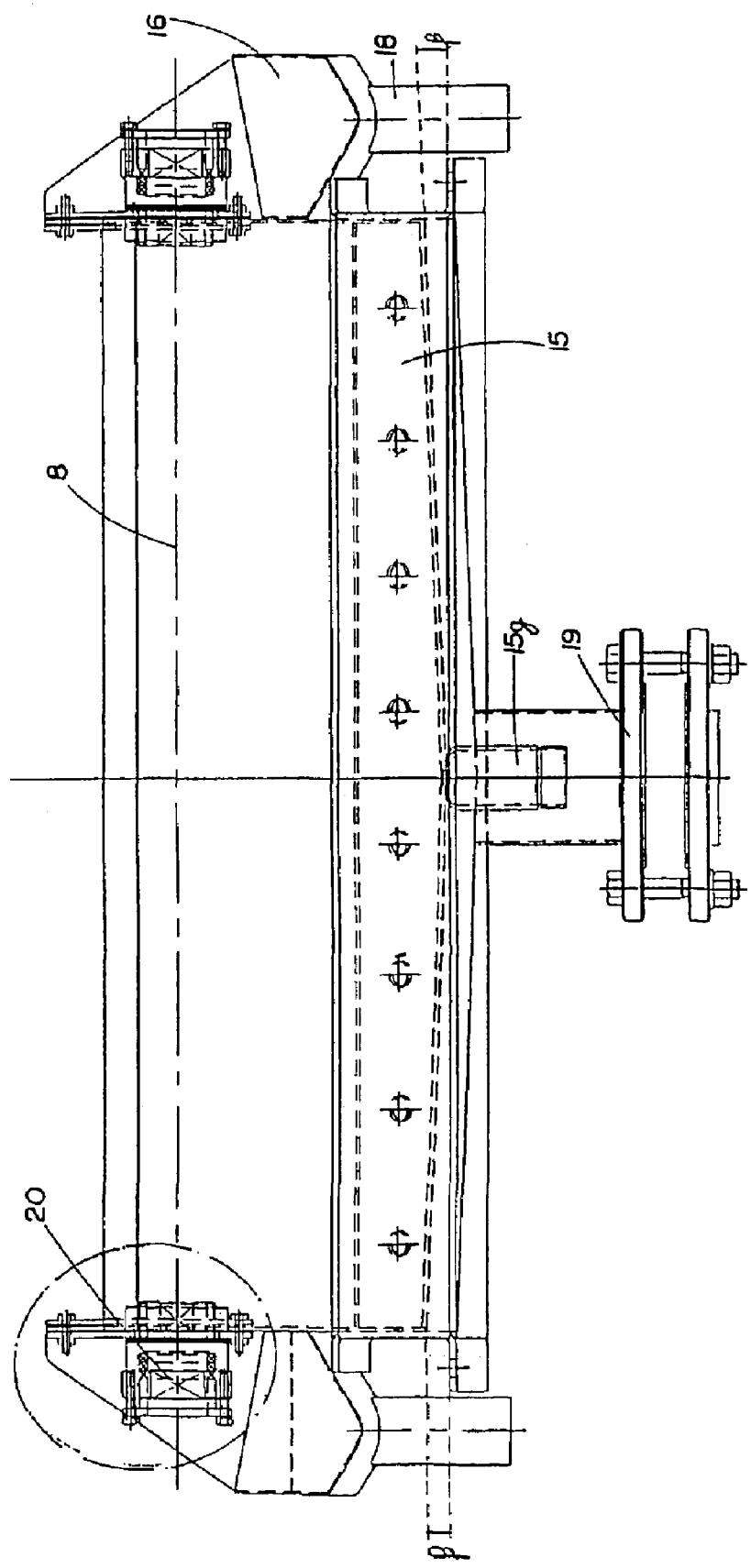
FIG. 5 shows a lateral section view of the emulsion tank, stressing axis sealing.
Figure 6:
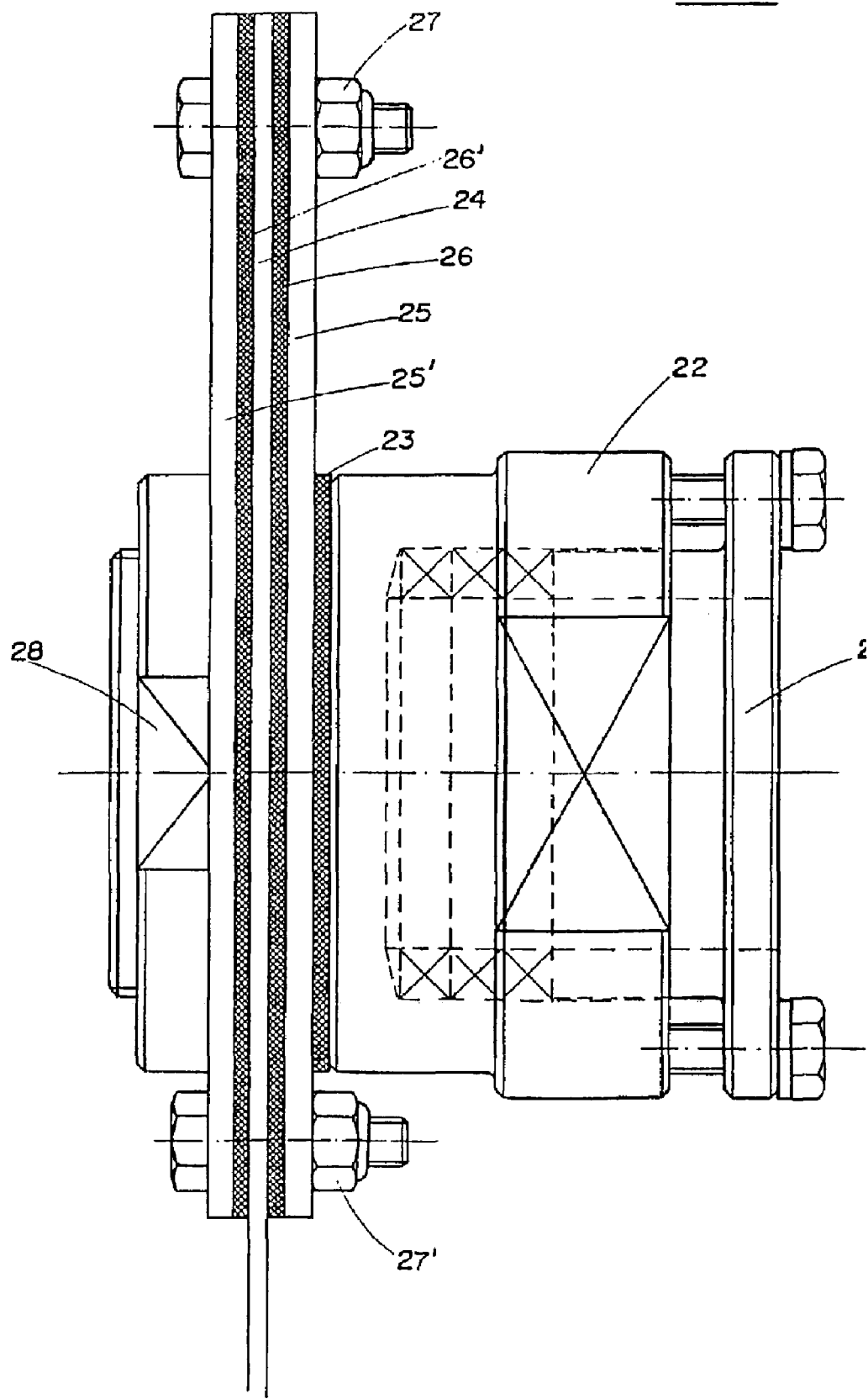
FIG. 6 shows a detailed view of the axis sealing.

FIG. 5 shows the emulsion tank (15), stressing the supporting axis (8). It can be seen that said emulsion tank (15) is supported on its center over a structure (19) and has a bottom with inclination "β" towards its longitudinal axis and cleaning discharge (15g). The sealing set (20) of said supporting axes (8) is separate for each axis and allows for quick substitution with no need to disassemble the bearing. This is done thanks to its structure incorporating, as detailed on FIG. 6 on the internal side, a squeezing flange (21) on the base of the valve gland (22) and, on the external side, a sealing gasket (23) followed by a support plate (24) sandwiched between two restriction plates (25) and (25') and two lateral closing joints (26) and (26'). These elements are rigidly fixed face to face by means of sets of bolts, screws and gaskets (27) and (27') located on their ends. Said valve gland is fixed by its most external end by means of a screw (28). On FIG. 5, it is shown that mentioned collector (16) has a pipe (18) on its bottom to transfer emulsion eventually leaking through said sealing set (20).

Figure 7:
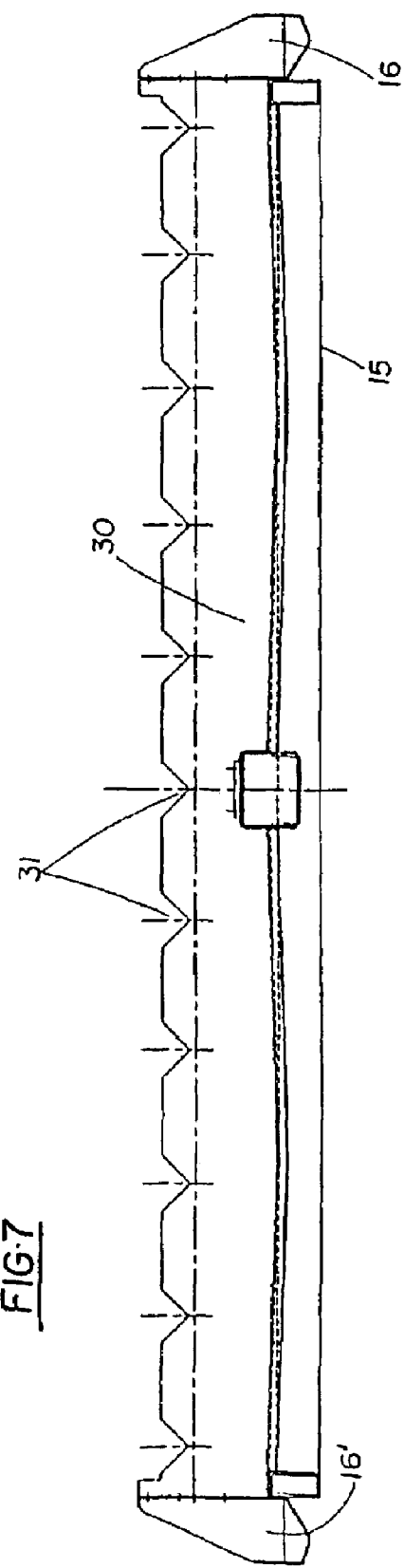
FIG. 7 shows a front view of the spillway.

FIG. 7 shows the spillway (30) equipped with "V"-shaped cut-outs (31) through which the water-citrus oil emulsion will drop towards the collecting and transfer box. Dimensions and quantity of cut-outs on the spillway will depend on specific characteristics of the machine project, such as capacity and flow.

Figure 8:
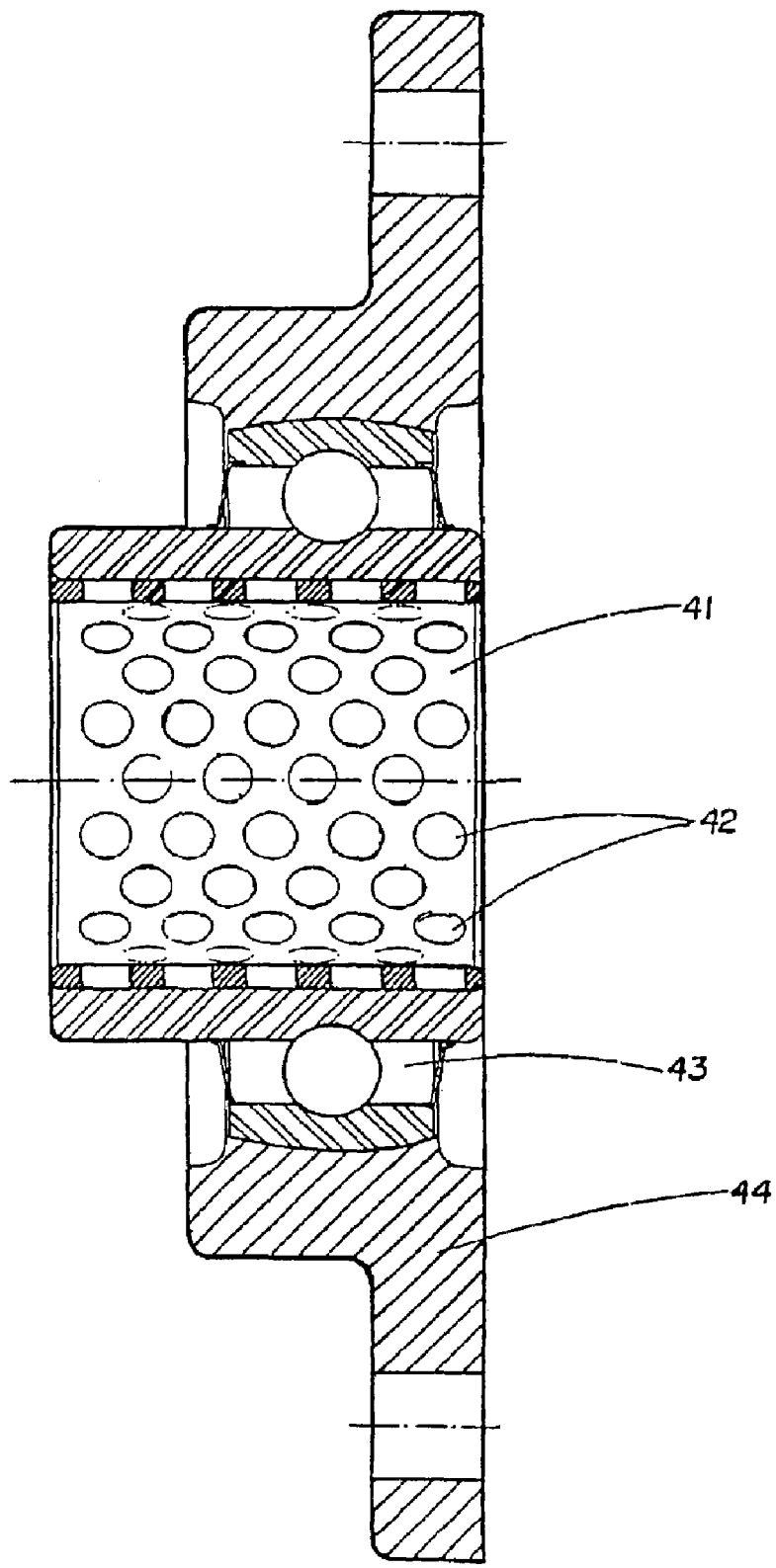
FIG. 8 shows a section view of the disk axis bearing.

FIG. 8 shows a section view of a bearing (40) of the supporting axes (8) of disks (9), representing rotation-bearing means. Said bearing (40) is of the linear-rotatory kind and comprises a chuck (41), eventually made of bronze, equipped with graphite blades (42), internally mounted over a self-aligning roll (43) located inside the base (44).

Figure 9:
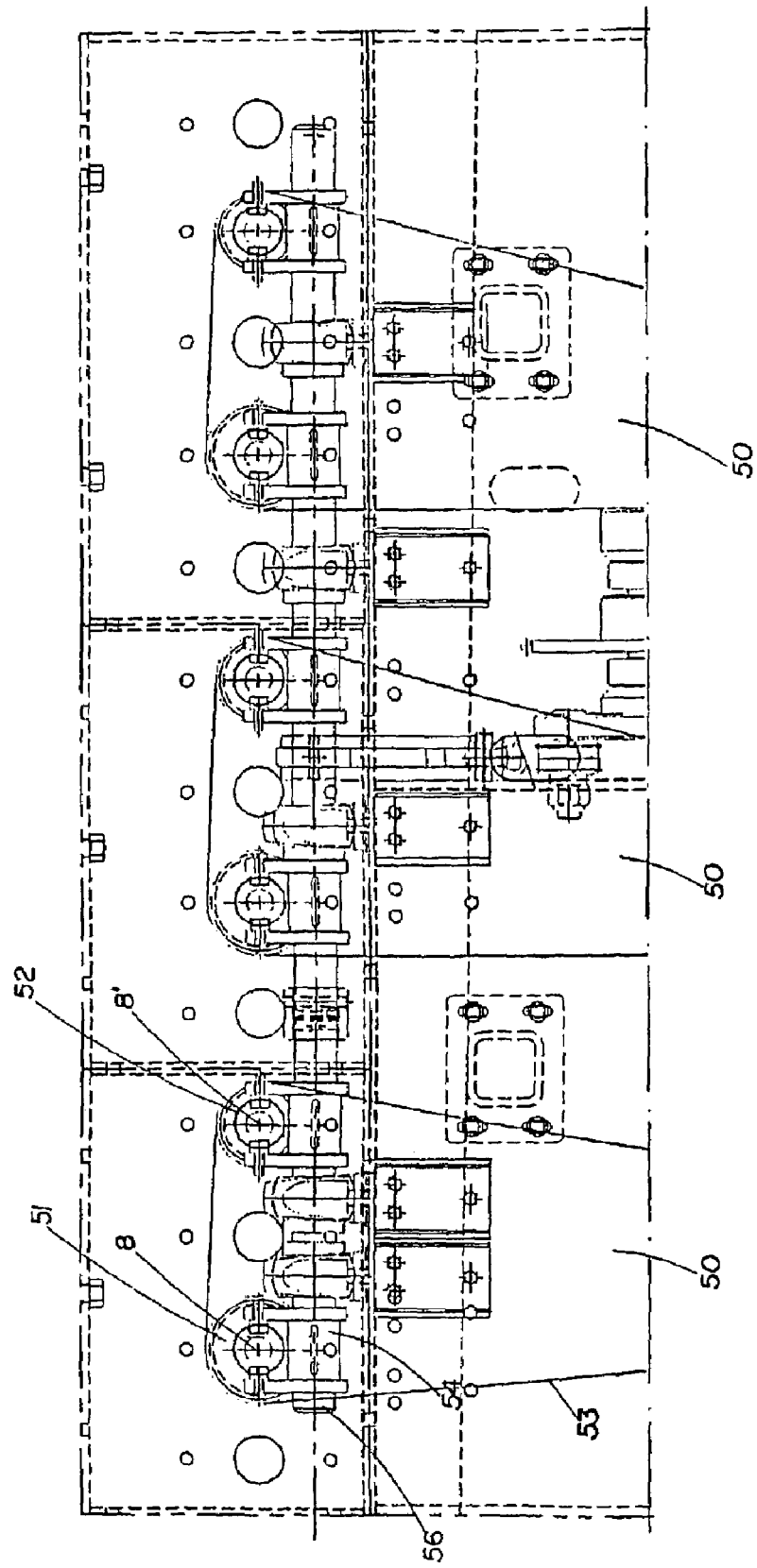
FIG. 9 shows a side view of the rotational movement system for the supporting axes.

FIG. 9 shows the set for rotational movement of the supporting axes (8), including a series of modules (50) comprising a pair of pulleys (51) and (52) assembled over the corresponding supporting axes (8) and (8'), which are operated by means of a chain or belt (53). Said supporting axes (8) and (8') are axially operated by means of handles (54) and (55) mounted over a lateral axis (56). The quantity of modules (50) existing in the machine object of the invention will only depend on the dimensional characteristics of the project.

FIG. 10 shows in further detail the handle (12) rod (11) set for axial operation of the supporting axis (8), where it can be seen that the connection with said elements is made by the end (13) of said supporting axis (8). The set is moved by a motor reducer (14) and an operation device consisting of a pulley (10) to which a pair of rods (11) is connected.

FIGS. 11 and 12 show the disk cleaning set (9). Such set consists of a transversal structure (60) laterally supported by pulleys (61) and (62), with a fruit removal bar (63) articulated therewith in a suspended fashion. Said structure (60) supports a series of spraying nozzles (64) used to clean said disks (9). The cleaning set is located above the disk (9) axes (8) and is provided with lengthwise movement, following the natural flow of fruit. This set has the purpose to remove the remaining fruit over the disks (9), when the fruit feed is interrupted, and simultaneously promotes the displacement of the spraying nozzle set (64), simultaneously cleaning the mentioned disks (9) by the action both of water jet pressure from the nozzles and the disk rotation. The cleaning water feed can be made by means of a flexible hose with high-pressure joint and provided with a degree of liberty for rotation.

Figure 13B:
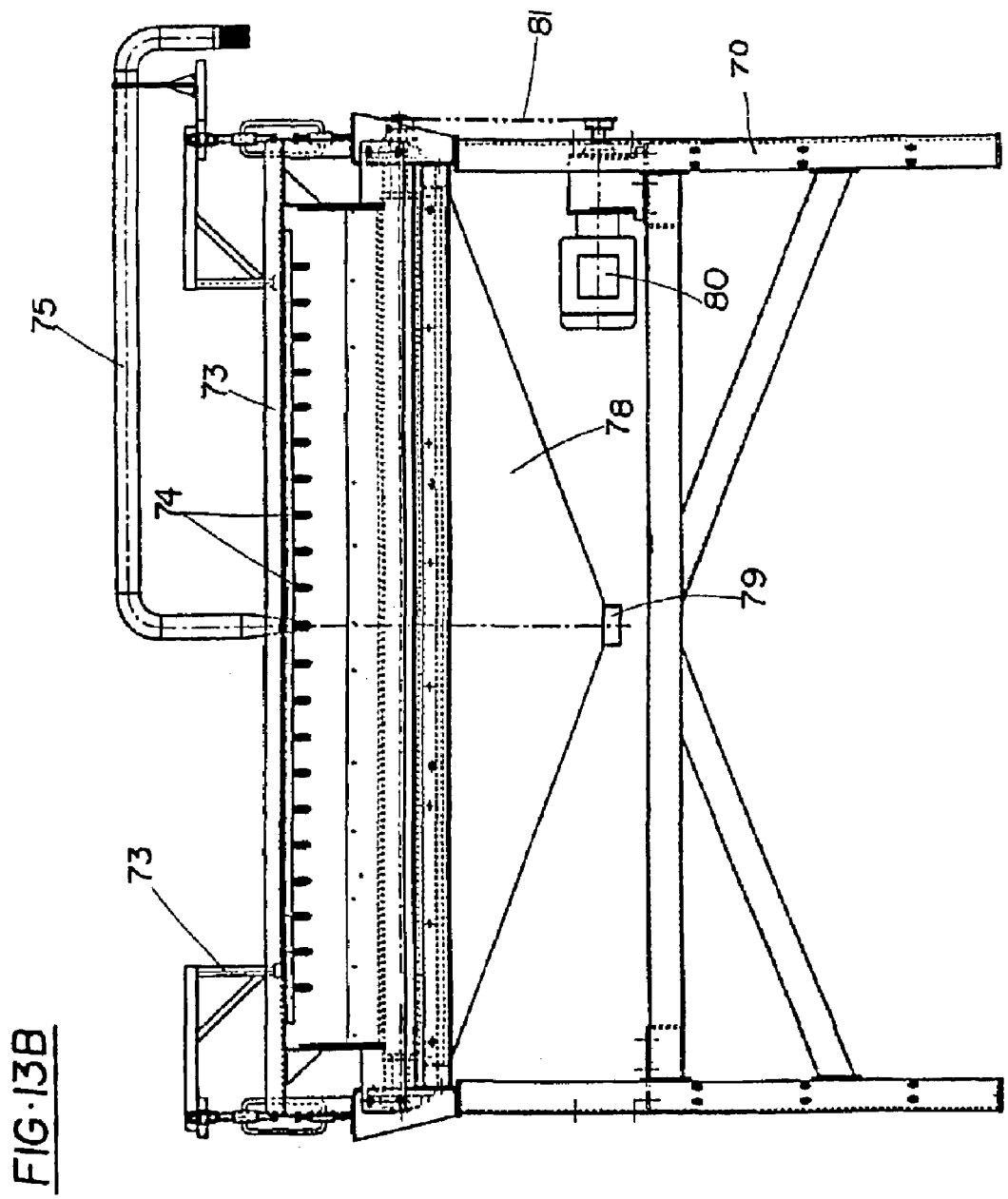

FIGS. 13a, 13b and 13c show the fruit washing and cleaning unit. Such washer/drier is mounted over a supporting structure (70) and consists of a feeding slope (71) for fruit which just passed by the disks (9), which are thrown over a first set of grooved rolls (72), over which a structure (73) supporting a set of spraying nozzle set (74) is located. The purpose of this first set of grooved rolls (72) is to provide for washing of the fruit from which the essential oil has been extracted, removing the still remaining oil over its surface. By means of a sequence of said grooved rolls (72), a second set of flat rolls (76), which have the purpose to dry the fruit surface immediately upon washing by the first set of rolls. The fruit then dried are discharged over the slope (77). Both the first (72) and the second (76) sets of rolls are located inside a collecting tub (78) provided with emulsion discharge pipes (79). Also, both the first (72) and second (76) roll sets are provided with rotational movement as offered by a motor reductor set (100) and chains (81).

Figure 14:
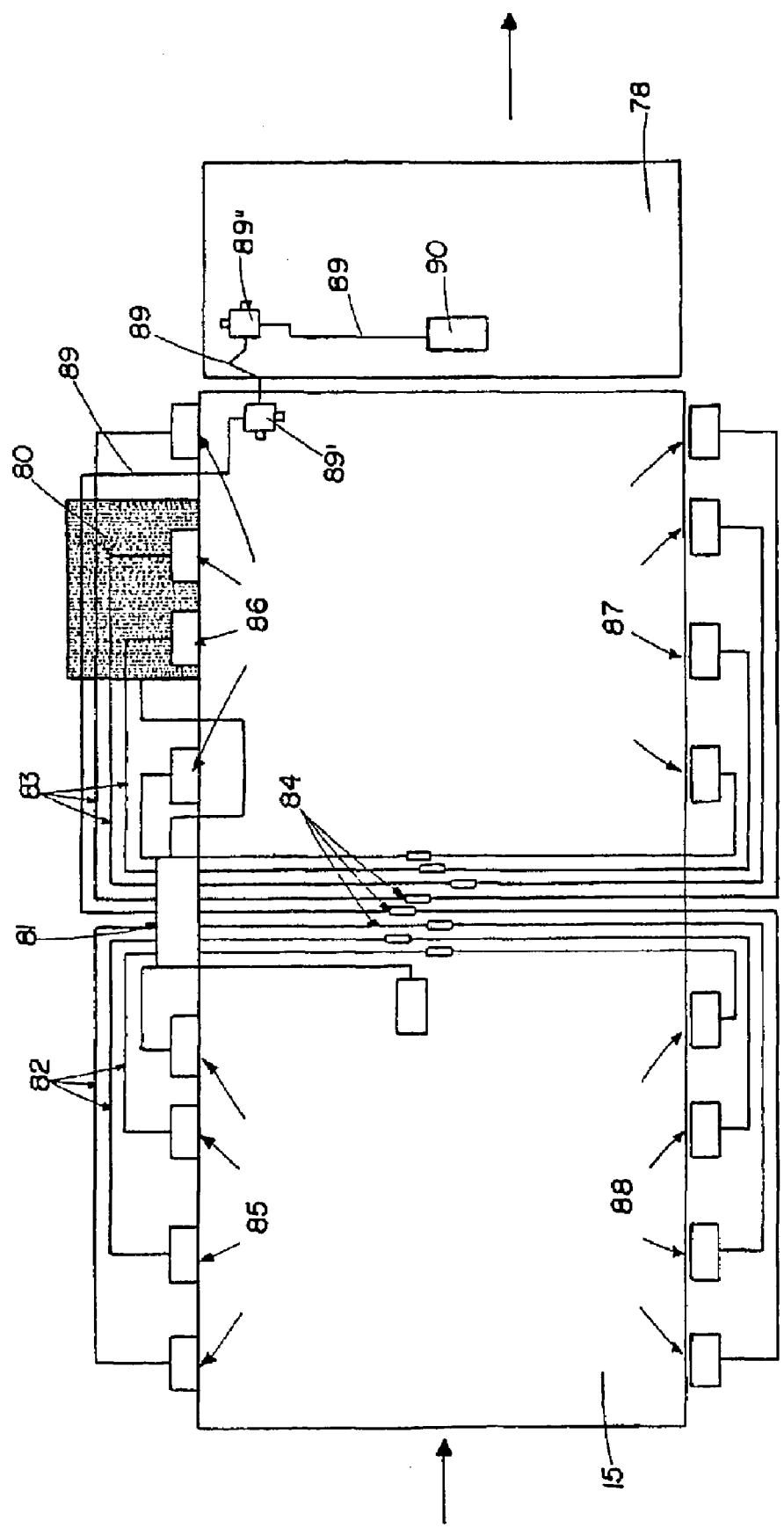
FIG. 14 shows the lubrication system scheme for the machine.

FIG. 14 shows the scheme of the automatic lubrication system of the machine. The lubrication system developed for the machine has the main purpose of providing for the application of oil and grease at specific points, with flow and time intervals duly regulated to guarantee the machine operation within ideal lubrication standards. The lubrication system includes therefore a lubricant command/pumping/tank frame (80). From that frame (80), specifically from the lubricant tanks, two pumps send oil and grease, respectively, to a central distributor (81). A timer circuit operates said oil and grease pumps, while the lubricant level in the tanks is sensed for replenishment. Through appropriate sets of pipes (82), (83) and (84), oil and grease are sent to a number of controlled flow distributors (85), (86), (87) and (88), from which they are sent to the application points, such as bearings, chains and others. Said distributors have holes with calibrated diameter for flow control in as many lubrication points. It can be seen that said controlled flow distributors (85), (86), (87) and (88) are strategically located around the emulsion tank (15). It can also be seen that each controlled flow distributor for the sets (85), (86), (87) and (88) has a specific connection to the central distributor (81) through the corresponding pipes (82), (83) and (84). However, special pipes (89) equipped with derivation blocks (89') and (89") feed a controlled flow distributor (90) installed to make the lubrication of elements from the fruit washing and drying unit (78).

This lubrication system therefore allows increasing the working life of the machine object of the invention, while reducing the frequency of maintenance and lubricant consumption.

The invention claimed is:

1. A machine to extract oil from fruit comprising:
    an emulsion tank for an emulsion comprising extracted oil from the fruit;
    a plurality of rotatable supporting axes each as a shaft extending through said emulsion tank;
    a plurality of perforating devices carried by said plurality of rotatable supporting axes for perforating fruit to extract oil therefrom;
    a plurality of bearings positioned outside of said emulsion tank and supporting for rotation said plurality of rotatable supporting axes; and
    at least one collector laterally adjacent said emulsion tank for collecting emulsion leakage from said bearings, wherein said plurality of rotatable supporting axes are arranged in removable modular units, each modular unit comprising a plurality of rotatable supporting axes to facilitate configuration changes for different fruit processing application changes.

2. A machine to extract oil from fruit according to claim 1 wherein each of said perforating devices comprises a disk.

3. A machine to extract oil from fruit according to claim 1 wherein each bearing comprises a rotary linear bearing.

4. A machine to extract oil from fruit according to claim 3 wherein each rotary linear bearing comprises:
    a base;
    a chuck;
    a plurality of blades carried by said chuck; and
    a self-aligning bearing mounting said chuck to said base.

5. A machine to extract oil from fruit according to claim 1 wherein said bearings comprises a respective pair of bearings for respective ends of each supporting axis; and wherein said at least one collection tank comprises a pair of collection tanks laterally adjacent opposite sides of said emulsion tank.

6. A machine to extract oil from fruit according to claim 1 further comprising at least one spray nozzle for directing fluid to said supporting axes.

7. A machine to extract oil from fruit according to claim 6 wherein said at least one spray nozzle is movable to a plurality of different positions.

8. A machine to extract oil from fruit according to claim 1 further comprising a cleaning set adjacent said emulsion tank and comprising:
   a transversal structure;
   a plurality of pulleys supporting said transversal structure;
   a fruit removal bar articulated with said transversal structure in a suspended fashion; and
   a plurality of spray nozzles carried by said transversal structure to clean said perforating devices as said transversal structure moves in a lengthwise direction following a natural flux of fruit.

9. A machine to extract oil from fruit according to claim 8 wherein said cleaning set removes remaining fruit over the perforating devices and simultaneously promotes displacement of said spraying nozzles by action of water jet pressure from the nozzles and rotation of said perforating devices.

10. A machine to extract oil from fruit according to claim 1 wherein said emulsion tank comprises a spillway having V-shaped cut-outs therein.

11. A machine to extract oil from fruit according to claim 1 further comprising an operation set and a motor reductor set connected thereto to alternatingly move said supporting axes.

12. A machine to extract oil from fruit according to claim 1 further comprising a sealing set for each supporting axis and comprising:
   a valve gland having a base;
   a squeezing flange for the base of said valve gland;
   two retention plates and two lateral closing joints; and
   a sealing gasket and a supporting plate sandwiched between said two retention plates and said two lateral closing joints.

13. A machine to extract oil from fruit according to claim 1 further comprising a unit for fruit washing and drying comprising:
   a first set of grooved rolls;
   a set of spraying nozzles adjacent said first set of grooved rolls; and
   a second set of plain rolls downstream from said first set of groove rolls.

14. A machine to extract oil from fruit according to claim 1 further comprising a lubrication system comprising:
   a lubricant tank and pump connected thereto; and
   a timer for operating said pump to lubricate application points.

15. A machine to extract oil from fruit according to claim 1 wherein said emulsion tank comprises two contiguous cells having a slope towards their corresponding longitudinal axes.

16. A machine to extract oil from fruit according to claim 1 further comprising spraying nozzle sets alongside said emulsion tank.

17. A machine to extract oil from fruit according to claim 1 further comprising side walls forming a tub around said emulsion tank to contain the emulsion therein and to keep feeding and discharge in a closed circuit.

* * * * *